United States Patent [19]
Brotherton

[11] 3,759,146
[45] Sept. 18, 1973

[54] BELT TENSIONER FOR WIDE BELT SANDING MACHINES

[75] Inventor: Cecil D. Brotherton, Coon Rapids, Minn.

[73] Assignee: Timesavers, Inc., Minneapolis, Minn.

[22] Filed: Apr. 7, 1972

[21] Appl. No.: 241,953

[52] U.S. Cl. .................... 92/13.6, 92/168, 92/169, 92/255
[51] Int. Cl. ........ F16j 1/00, F16j 11/02, F16j 15/18
[58] Field of Search .................... 92/13.6, 255, 169, 92/258, 168

[56] References Cited
UNITED STATES PATENTS

| | | | |
|---|---|---|---|
| 2,556,979 | 6/1951 | Purcell | 92/13.6 |
| 2,770,510 | 11/1956 | Collins | 92/258 |
| 2,997,026 | 8/1961 | Zimmerer | 92/169 |
| 3,056,573 | 10/1962 | Matheson et al. | 92/255 |
| 3,250,247 | 5/1966 | Beamon | 92/13.6 |
| 3,405,787 | 10/1968 | Meier et al. | 92/13.6 |
| 3,598,021 | 8/1971 | Langlund et al. | 92/169 |

*Primary Examiner*—Paul E. Maslousky
*Attorney*—Ira Milton Jones

[57] ABSTRACT

The cylinder of a fluid motor comprises a length of steel tubing, a disc-like closure member secured in one end thereof by snap rings, and an apertured closure member secured to its other end by cap screws threaded axially into its wall. A concentric cap screw through the piston secures it to a rod made of a length of shafting. The piston extension stroke limit is defined by a snap ring on the rod, engageable with the apertured closure member; the retraction limit by engagement of the head of the concentric cap screw against the other closure member.

1 Claim, 4 Drawing Figures

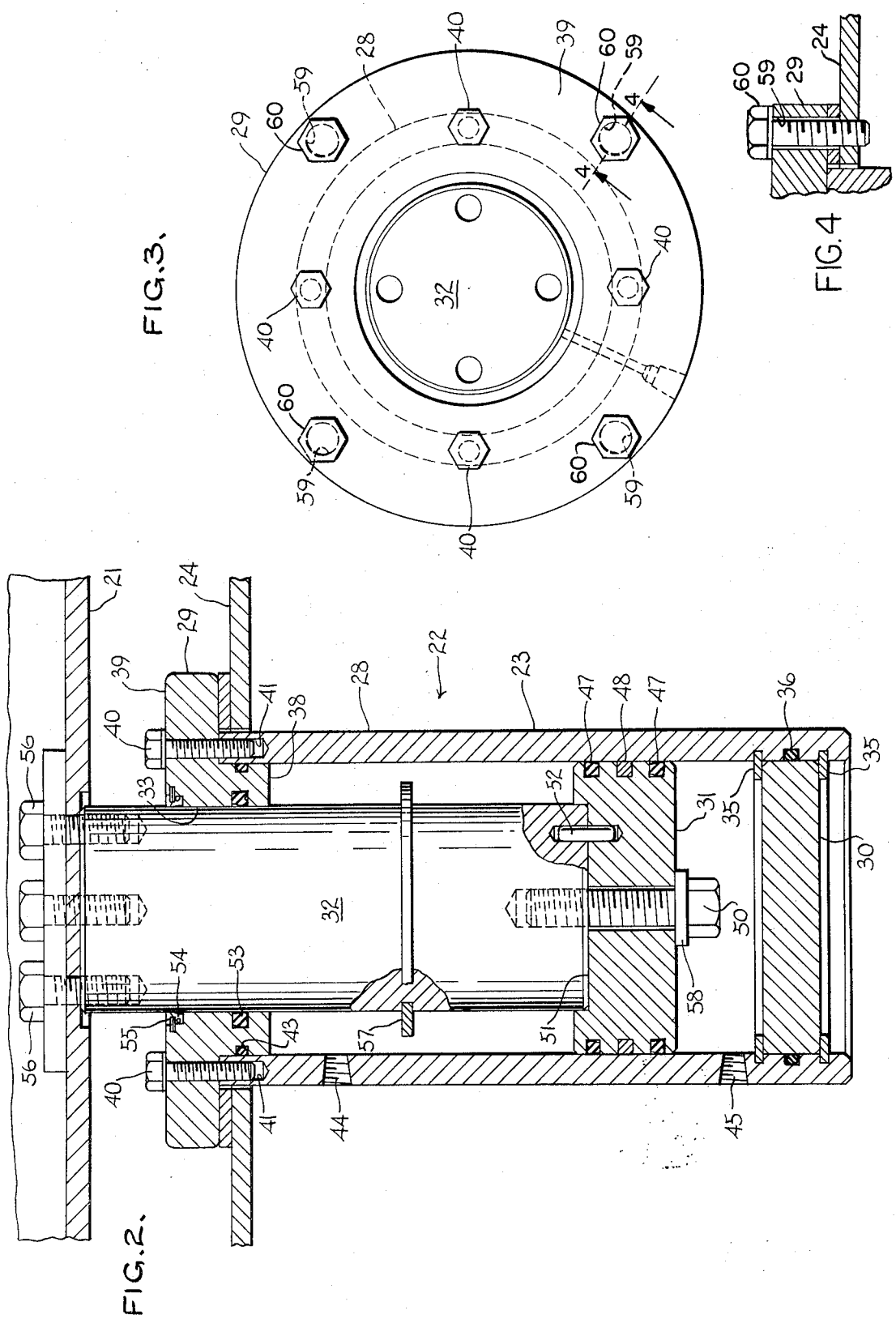

BELT TENSIONER FOR WIDE BELT SANDING MACHINES

This invention relates to fluid motors of the cylinder and piston type, and has as its general object to provide a very inexpensive motor of that type which can be manufactured from readily available metal stock and other standard parts, without molding or casting operations and with a relatively small number of machining operations that require a minimum of labor and equipment.

Heretofore a hydraulic or pneumatic motor of the cylinder and piston type had its cylinder fabricated from one or more special castings that were finished by means of slow and costly machining operations, and also had a piston and piston rod that had to be manufactured and assembled in a slow and expensive manner.

By contrast, it is an object of this invention to provide such a motor that has a cylinder member which comprises a straight length of steel tubing and end closures which can be quickly and inexpensively made and which can be secured to the cylinder member by means of bolts and snap rings.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 2 is a longitudinal sectional view of a fluid motor embodying the principles of this invention;

FIG. 3 is a top view of the motor; and

FIG. 4 is a detail sectional view through FIG. 3 on the plane of the line 4—4.

Figure 1:
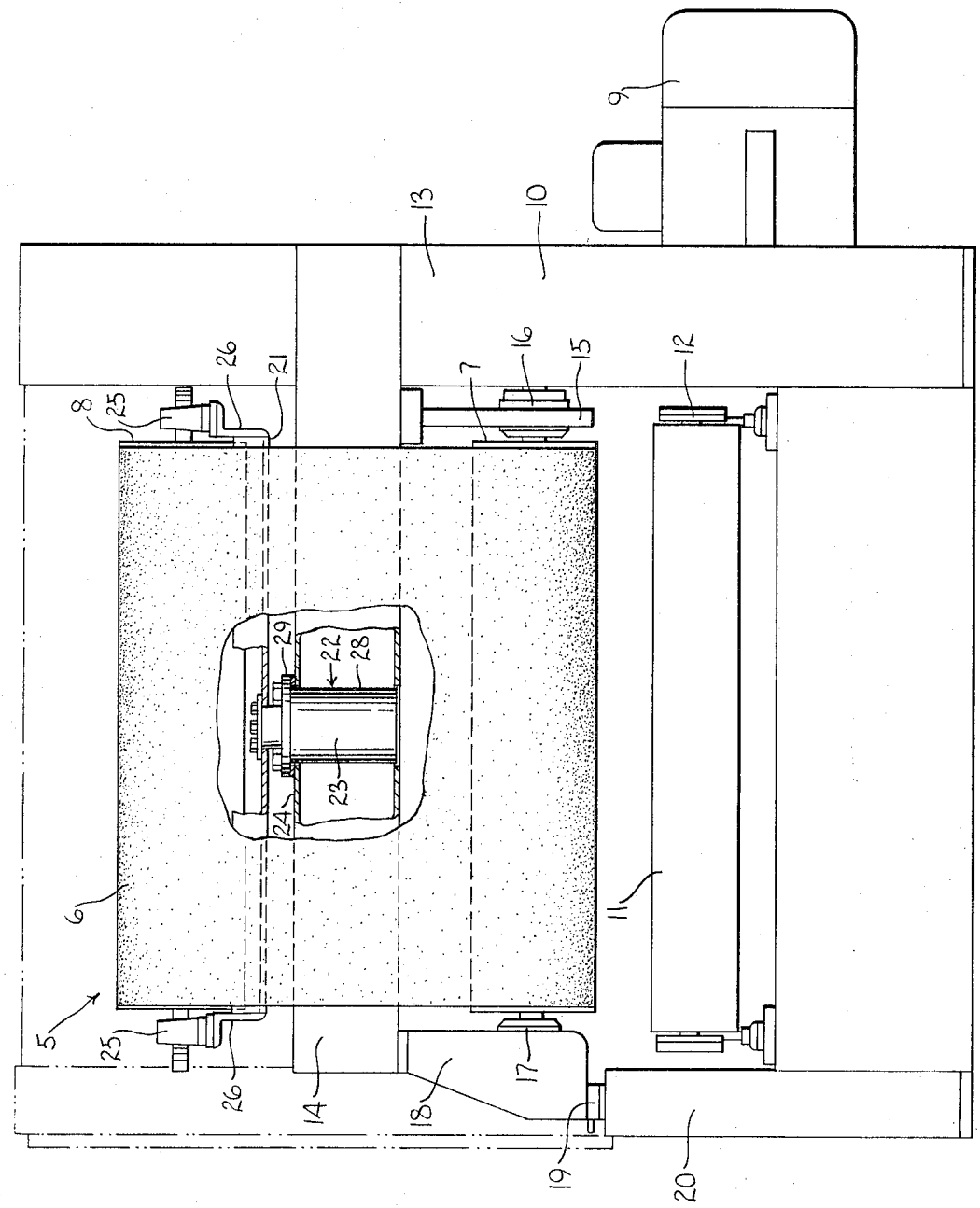
FIG. 1 is a view in elevation, with portions shown broken away, of a wide belt sanding machine having a pneumatic motor embodying the principles of this invention for tensioning the abrasive belt on its sanding head, and the figure is thus illustrative of one application of the fluid motor of this invention.

Referring now more particularly to the accompanying drawings, the numeral 5 designates generally the sanding head of a wide belt sanding machine, comprising, in general, an abrasive belt 6 that is trained around a lower contact drum 7 and an upper tensioning roller 8. An electric motor 9 mounted on the frame 10 of the machine rotatably drives the contact drum 7, which in turn drives the abrasive belt orbitally. A belt conveyor 11, mounted on a vertically adjustable platen 12 on the machine frame, carries work pieces along a horizontal path beneath and past the sanding head.

As is more or less conventional, the machine frame 10 is welded together and comprises a rather high upright support 13 at one side of the machine and a cantilevered arm or center bar 14 that projects horizontally from that upright to the other side of the machine. The center bar, which is of rectangular cross section and of box-like construction, is welded or bolted to the upright 13 and is disposed between the tensioning roller and the contact drum, lengthwise parallel to them. A bracket-like support 15 that projects down from the center bar adjacent to the upright 13 carries one bearing 16 for the contact drum 7. The other bearing 17 for that drum is carried by a shoe-like bracket 18 that projects down from the outer end of the center bar.

Since the contact drum receives all of the work reaction forces imposed upon the sanding head, the outer end of the center bar should be steadied and supported from the lower portion of the machine frame 10 when the machine is in use. To that end there is a removable connection 19 between the shoe-like bracket 18 and a shorter upright frame member 20 that projects up toward that bracket. This connection is arranged so that it can be removed when the machine is not in use in order to provide for replacement of the endless abrasive belt 6, inasmuch as a new belt has to be passed edgewise between the shoe-like bracket 18 and the shorter upright 20, in order to get its bottom portion around the contact drum.

During operation of the machine the abrasive belt should be under tension so that it will have good driving engagement with the contact drum, but for replacement the abrasive belt must be substantially slackened. For up and down motion of the tensioning roller 8, by which such tensioning and slackening of the abrasive belt is effected, that roller is carried by a yoke 21 which is in turn secured to the movable element of a cylinder and piston type pneumatic motor 22 that embodies the principles of this invention. The cylinder 23 of the motor 22 has its axis upright and is mounted between the side walls of the box-like center bar 14, midway between the ends thereof. Holes in the top and bottom walls of the center bar can accommodate the upper and lower end portions of the cylinder which can be secured to the top wall 24 of the center bar as hereinafter explained.

Bearings 25 for the tensioning roller are mounted on the upright arms 26 of the yoke 21, which is wide and more or less U-shaped to span the tensioning roller lengthwise thereof.

The cylinder 23 of the pneumatic motor 22 comprises a tubular cylinder member 28 and upper and lower closure members 29 and 30 fixed at its opposite ends. A piston 31 is slidable in the cylinder member, and a piston rod 32 that is fixed to the piston projects upwardly through a concentric hole 33 in the upper closure member 29 and has the yoke 21 secured to its top.

The cylinder member 28 is simply a straight length of standard steel tubing. The inside surface of seamless tubing sold as "prehoned" is sufficiently smooth so that it needs no finishing.

The lower closure member 30 is merely a rather thick disc that is secured in place in the lower end of the cylinder member by means of snap rings 35 that lie against its opposite axial faces and are seated in circumferential grooves in the inner surface of the cylinder member. A seal between the closure disc 30 and the cylinder member is provided by an O-ring 36 that surrounds the disc and is radially compressed between it and the cylinder member, being seated in a circumferential groove in the inner surface of the cylinder member that is axially intermediate the grooves for the snap rings 35.

The upper closure member 29 is essentially a disc-like collar with an overall diameter substantially larger than that of the cylinder member and a reduced diameter concentric lower portion 38 which is received with a close fit in the upper portion of the cylinder member. The larger diameter upper portion 39 of the closure member 29 thus defines a flange which overlies the upper end of the cylinder member and projects radially beyond the cylinder member. Circumferentially spaced cap screws 40 extend down through this flange to be received in upwardly opening tapped wells 41 in the cylinder member, thus securing the upper closure member thereto.

An O-ring 43 that surrounds the reduced diameter lower portion 38 of the upper closure member is seated in a circumferential groove therein to provide a seal between the upper closure member and the cylinder member.

Two fluid ports open through the wall of the cylinder member. One of them, designated 44, is spaced a short distance below the upper closure member 29, and the other, designated 45, is upwardly adjacent to the lower closure member 30. As shown, these ports are tapped for standard threaded pipe connections.

Note that the only machine operations that need to be performed on the cylinder member are the boring and tapping of the ports 44 and 45 and of the wells for the cap screws 41, and forming the grooves that receive the snap rings 35 and the O-ring 36. Notice also that no part of the cylinder is subjected to any welding operation that might tend to warp or deform it.

The piston 31 comprises a relatively thick disc or plug-like member having three circumferential grooves therein in which rings 47 and 48 are seated that provide a slidable seal between the piston and the cylinder member. The axially outermost rings 47 can be V-rings, while the middle ring 48 can be a felt wiper.

The piston rod 32 is a length of standard steel shafting. It is secured to the piston 31 by means of a single rather large cap screw 50 which extends concentrically through the piston from its underside and which is received in a concentric tapped well opening to the bottom of the rod. Since the cap screw 50 must extend through the piston with some clearance the piston can have a shallw concentric well 51 in its upper surface in which the lower end portion of the rod is seated with a close fit to assure concentricity of the rod and the piston. Relative rotation between the piston and the rod is prevented by an eccentric axially extending spring pin 52 that is received in an upwardly opening well in the piston and an aligned downwardly opening well in the rod.

The bore or hole 33 in the upper closure member through which the rod passes is of such diameter that the rod has a sliding fit therein. To provide a seal around the rod, a V-ring 53 is seated in a circumferential groove in this bore surface, intermediate the top and bottom surfaces of the upper closure member, and a bronze wiper ring 54, together with a spring clip 55 that holds it in place, are secured in suitable circumferential recesses in the upper closure member, near the top thereof.

The yoke 21 is secured to the flat upper end of the piston rod by means of cap screws 56 which extend through the base portion of the yoke, midway between its arms 26, and are threaded into upwardly opening wells in the rod.

For proper operation of the motor, its piston must not cross or cover either of the fluid ports 44 or 45. To insure that the piston will always be spaced below the upper port 44, there is a snap ring 57 around the rod, for engagement with the underside of the upper closure member 29 at the limit of the extension stroke of the piston. The snap ring 57 is seated in a circumferential groove in the rod that is spaced above the piston by a distance somewhat greater than the spacing between the upper closure member and the upper fluid port.

The limit of retracting motion of the piston is defined by the head of the cap screw 50 that secures the rod to the piston, which projects beneath the piston to engage the upper surface of the lower closure member and thus maintain the piston always spaced above the lower fluid port 45. The effective axial depth of that screw head is increased by a lock washer 58 under it.

For securing the pneumatic motor in place in the center bar, the radially outermost portion of the top closure member has a ring of circumferentially spaced bolt holes 59, to accommodate bolts 60 that are threaded into appropriately located tapped holes in the top wall 24 of the center bar.

From the foregoing description taken with the accompanying drawings it will be apparent that this invention provides a very inexpensive fluid motor of the cylinder and piston type, capable of being manufactured from readily available parts and materials with a minimum of labor and equipment.

Those skilled in the art will appreciate that the invention can be embodied in forms other than as herein disclosed for purposes of illustration.

The invention is defined by the following claims:

1. A belt tensioner for sanding machines and the like comprising in combination:
   A. a pair of superimposed rigid members movable towards and away from one another, one of said members having a hole therethrough;
   B. a piston and cylinder type fluid pressure motor connecting said superimposed members and comprising
      1. a cylinder consisting of a straight piece of tube stock having a uniform wall thickness from end to end and having one end portion thereof received in the hole in said one rigid member,
      2. a collar secured to said end portion of the cylinder, said collar having a flange portion projecting beyond the outer diameter of the cylinder and overlying the portion of said one rigid member bounding the hole therein and secured to said one rigid member whereby the cylinder is fixed to said one rigid member, said collar having a bore smaller in diameter than the bore of the cylinder and coaxial therewith,
      3. a uniform diameter piston rod passing slidably through the bore in said collar and having an outer end portion which spans the distance between said superimposed rigid members and an inner end portion inside the cylinder,
      4. means securing the outer end portion of the piston rod to the other one of said rigid members,
      5. a piston fixed to the inner end portion of the piston rod and having sealing engagement with the bore of the cylinder,
      6. a closure disc snugly fitted into the other end of the cylinder to close the same,
      7. a pair of snap rings seated in annular grooves in the cylinder bore at opposite sides of said closure disc to secure the same in place, 8. means projecting from the side of the piston remote from the piston rod to collide with the closure disc and define the limit of retraction of the piston into the cylinder at a point spaced from the closure disc,
9. a snap ring seated in a groove encircling the piston rod and projecting radially beyond the cylindrical surface of the piston rod to collide with the portion of said collar bounding the bore therein to limit projection of the piston rod out of the cylinder, and
10. ports through the wall of the cylinder for the passage of pressure fluid into and out of the cylinder, said ports being spaced apart axially of the cylinder and so located as to be at opposite sides of the piston in all positions thereof.

* * * * *